W. SPEAR.
REFRIGERATOR.
No. 172,353.　　　　　　　　Patented Jan. 18, 1876.
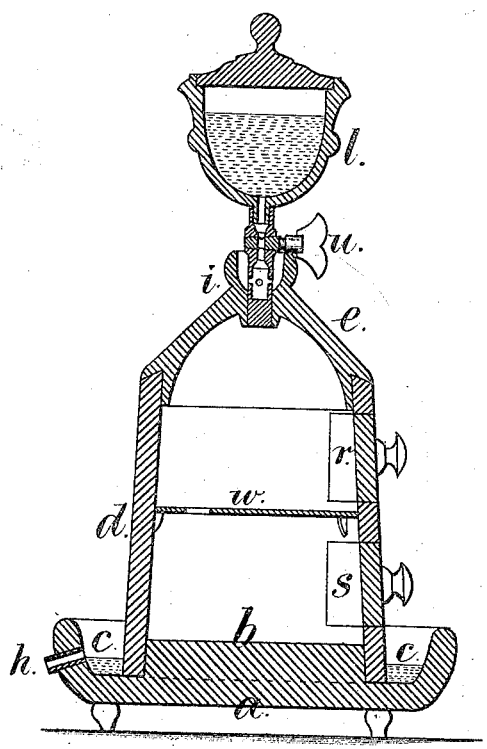
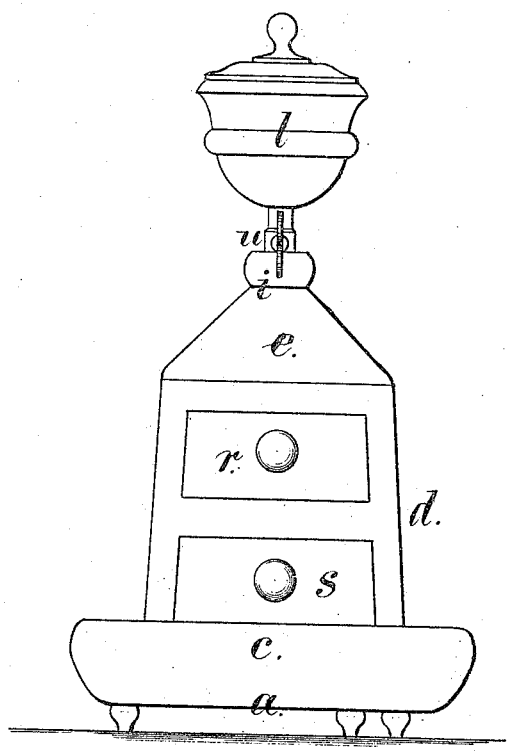
Witnesses
Chas. H. Smith
Harold Serrell
Inventor
William Spear
per Lemuel W. Serrell
Atty

UNITED STATES PATENT OFFICE.

WILLIAM SPEAR, OF LYNN, MASSACHUSETTS.

IMPROVEMENT IN REFRIGERATORS.

Specification forming part of Letters Patent No. 172,353, dated January 18, 1876; application filed June 23, 1875.

*To all whom it may concern:*

Be it known that I, WILLIAM SPEAR, of Lynn, in the county of Essex and State of Massachusetts, have invented an Improvement in Refrigerators, of which the following is a specification:

I make use of a vessel to contain the articles, such as butter, meat, &c., to be kept cool, and I provide a conical cover, to which water is supplied near the apex, and allowed to run slowly over the surface of the cover and the sides of the vessel into a trough-shaped base. The material employed is preferably earthenware, so that the surface will become moist and retain sufficient water by capillary attraction to effect the cooling of the contents by the evaporation of the water.

This cooler, although operating upon known philosophical principles, is constructed with reference to the convenient distribution of the water-supply, and for giving easy access to the contents of the cooler, and for excluding water from the inside of the vessel.

In the drawing, Figure 1 is a vertical section of the refrigerator, and Fig. 2 is an elevation of the same.

The base $a$ of the cooler is made with a central platform, $b$, raised above the surrounding trough $c$, and the vessel $d$ rises from the base $a$ to the cap $e$, and the vessel $d$ is preferably cylindrical, but may be square or prismatic, and the cap $e$ will be conical or pyramidal, and at the apex $i$ the water is to be supplied, and the same flows over the conical cap $e$ and exterior portion of the vessel $d$, and any surplus of water accumulates in the trough $c$, and passes from the overflow $h$. The top of the vessel $d$ and the under side of the cover $e$ are beveled, so that the joint is inclined downwardly, in order that water may not run into the interior of the vessel $d$, and it is preferable to make the cover $e$ and vessel $d$ of earthenware, so that the surface may absorb the water, and by the evaporation constantly going on, the vessel and its contents will be cooled.

The water may run by a flexible pipe to the apex-cup $i$, where a convenient supply exists; but, generally, there will be an urn, $l$, in which water is placed, and from which the liquid passes slowly, the quantity being regulated by the cock $u$.

Within the vessel $d$ there are suitable supports for the articles to be cooled, and in Fig. 1 I have shown the movable platform $w$, and the doors $r$ and $s$, that can be opened to insert or remove the articles in the cooler.

The cap or cover $e$ may be removed to gain access to the contents of the refrigerator.

I am aware that many of the separate parts are well known, and that water has been allowed to flow over the outside of a vessel to cool it. By making the base with a trough and raised central portion, all surplus and condensation will flow into the trough, and the parts can be separated for cleaning.

I claim as my invention—

The base $a$, with a central raised platform, $b$, and surrounding trough $c$, in combination with the vessel $d$, removable cap $e$, and water-distributer at the apex of the cap, as set forth.

Signed by me this 14th day of June, 1875.

WM. SPEAR.

Witnesses:
 WM. HOWLAND,
 EMMA F. SPEAR.